Sept. 18, 1923.
J. D. HORTON
GROUSER
Filed April 10, 1922
1,468,204
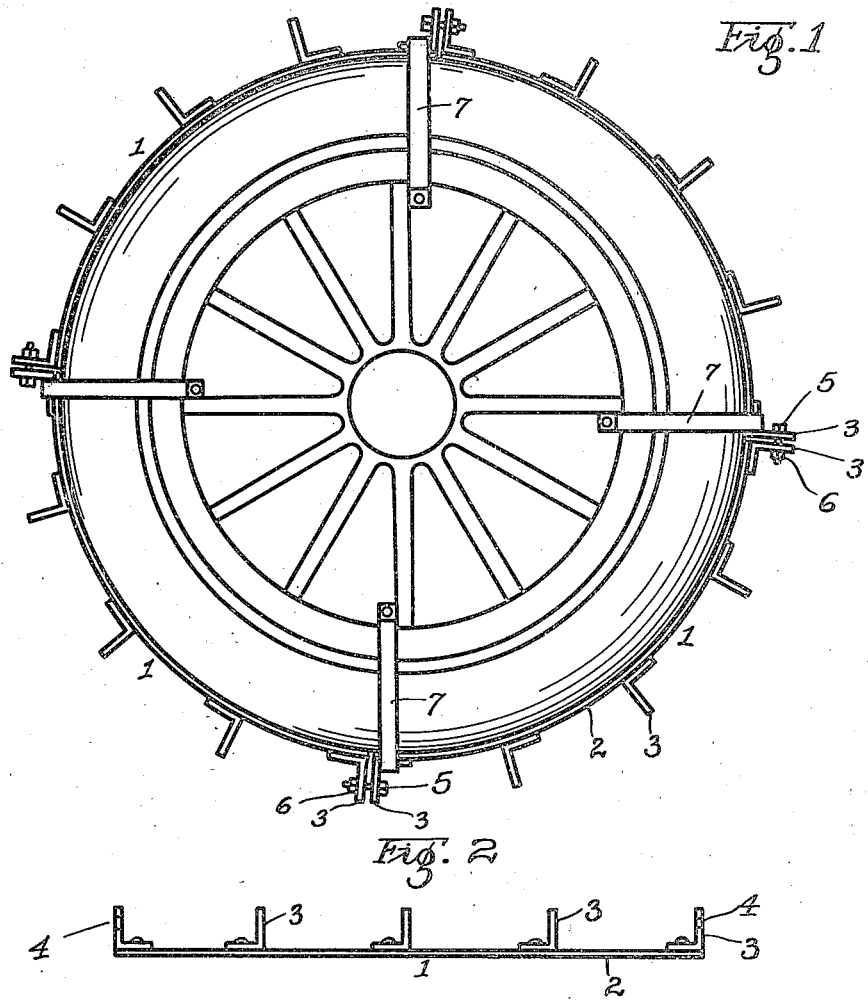
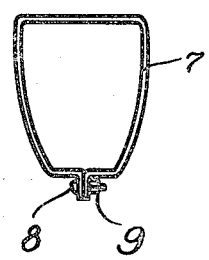
Inventor
JAMES D. HORTON
By Harry C. Schroeder
Attorney Patented Sept. 18, 1923.

1,468,204

UNITED STATES PATENT OFFICE.

JAMES D. HORTON, OF OAKLAND, CALIFORNIA.

GROUSER.

Application filed April 10, 1922. Serial No. 550,982.

*To all whom it may concern:*

Be it known that I, JAMES D. HORTON, a citizen of the United States, residing at Oakland, in the county of Alameda and State of California, have invented certain new and useful Improvements in Grousers, of which the following is a specification.

My invention is a detachable grouser for automobile wheels which is efficient in operation, durable, and may be manufactured at a low cost.

Referring to the annexed drawing in which my invention is illustrated and which forms a part of this specification:

Figure 1 is a side elevation of an automobile wheel and my grouser attached thereto.

Figure 2 is a side view of one section of my grouser.

Figure 3 is an elevation of one of the attaching straps.

My grouser is made in a plurality of sections 1, preferably four in number, each of which comprises a thin strip of metal 2 and a plurality of angle iron grouser plates 3 secured by one member to said strip from end to end thereof at equal distances apart. The outstanding member of the angle iron at each end of the strip 2 is provided with an aperture 4.

The sections 1 are placed with the strips 2 bent against the tread of the tire with the grouser plates 3 outward and said sections are detachably secured together at their ends by bolts 5 and nuts 6 which bolts extend through the apertures 4 of adjacent grouser plates. Straps 7 are extended around the felly, rim and tire of the wheel and around one end of the sections 1 respectively, inside the outstanding members of the grouser plates at said end of the sections, and the ends of said straps are brought together inside the felly between the spokes of the wheels and detachably secured together by bolts 8 and nuts 9 which straps prevent the grouser from creeping on the tire.

Having described my invention, I claim:

1. A grouser including a plurality of sections, each section comprising a strip of metal bent to fit the tread of the tire and a plurality of angle iron grouser plates secured by one member to said strips from end to end thereof, bolts and nuts for holding together the grouser plates at adjacent ends of the section strips, and straps extending around the felly, rim and tire of the wheel and between the spokes of the wheel and around one end of the strips inside the outstanding member of the grouser plates at the ends of said strips, and bolts and nuts for securing the ends of the straps together.

2. A grouser for a motor vehicle wheel and tire comprising a plurality of sections located about the periphery of the tire, a plurality of non-skid plates projecting radially outward from the surface of said sections, each section having a non-skid plate near each of its ends, means passing through the end plates of adjoining sections to secure them together in operative position, and means for securing the grouser in position on the vehicle wheel, said last named means comprising clamping members which extend around the tire and one of said sections, each of said clamping members being in contact with one of the end plates of a section.

3. A grouser for a motor vehicle wheel and tire comprising a plurality of sections located about the periphery of the tire, a plurality of non-skid plates projecting radially outward from the surface of said sections, each section having a non-skid plate near each of its ends, means passing through the end plates of adjoining sections to secure them together in operative position, and means for securing the grouser in position on the vehicle wheel, said last named means comprising clamping members extending around the tire and in contact therewith, each of said members located so as to have a part in contact with a spoke of the wheel and another part in contact with one of said non-skid plates on the end of one of said sections.

4. A grouser for automobile wheels, including a plurality of sections, each section comprising a strip of metal bent to fit on the tire at its periphery, and having a plurality of radially and outwardly extending grouser plates secured thereto, one of said grouser plates located at each end of said section, means for securing corresponding ones of these last mentioned plates on adjoining sections together, and straps extending around the section, the tire, the rim and felly and located between the spokes of the wheel.

In testimony whereof I affix my signature.

JAMES D. HORTON.